United States Patent
Haney

(10) Patent No.: US 8,888,431 B2
(45) Date of Patent: Nov. 18, 2014

(54) ADJUSTABLE BONDING WASHER

(71) Applicant: Hubbell Incorporated, Shelton, CT (US)

(72) Inventor: Harley Alan Haney, Gurnee, IL (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 13/844,023

(22) Filed: Mar. 15, 2013

(65) Prior Publication Data

US 2014/0273665 A1    Sep. 18, 2014

(51) Int. Cl.
*F16B 43/02*    (2006.01)
*H01R 9/16*    (2006.01)
*H01R 43/027*    (2006.01)

(52) U.S. Cl.
CPC .............. *H01R 9/16* (2013.01); *H01R 43/027* (2013.01)
USPC .......................................... 411/539; 411/163

(58) Field of Classification Search
CPC ...... F16B 33/002; F16B 39/10; F16B 43/005; F16B 43/007
USPC ......... 411/132, 136, 147, 163, 535, 539, 541, 411/542
See application file for complete search history.

(56) References Cited

U.S. PATENT DOCUMENTS

| | | | |
|---|---|---|---|
| 325,235 A | 9/1885 | Bulmer et al. | |
| 329,615 A | 11/1885 | Andrews | |
| 554,431 A * | 2/1896 | White | 411/539 |
| 647,928 A * | 4/1900 | Adams | 411/539 |
| 878,476 A | 2/1908 | Barker | |
| 1,151,131 A * | 8/1915 | Starliper | 403/344 |
| 1,183,174 A | 5/1916 | Dice | |
| 1,191,565 A | 7/1916 | Chambers | |
| 1,288,973 A * | 12/1918 | Osborn | 411/539 |
| 1,452,492 A | 4/1923 | Carpenter | |
| 1,721,363 A | 7/1929 | Wesp | |
| 1,724,595 A | 8/1929 | Hyle | |
| 1,937,818 A | 5/1930 | French | |
| 1,878,199 A | 9/1932 | Stenger | |
| 1,904,296 A | 4/1933 | Royse | |

(Continued)

FOREIGN PATENT DOCUMENTS

| | | |
|---|---|---|
| FR | 769005 | 8/1934 |
| FR | 49768 | 7/1939 |
| JP | 06309640 | 11/1994 |

OTHER PUBLICATIONS

Wiley Index of WEEB Datasheets, Wiley Electronics LLC 2011.

(Continued)

*Primary Examiner* — Roberta Delisle
(74) *Attorney, Agent, or Firm* — Alan I. Cantor; Mark S. Bicks; Alfred N. Goodman

(57) ABSTRACT

An adjustable bonding washer for placement between two metal pieces to create an electrical bond between them. The bonding washer has two metallic parts constrained to slide relative to one another along an axis. Each part has oppositely directed teeth that are forcibly embedded into the metal pieces to make electrical contact with them when they are rigidly clamped together. Adjustability enables the bonding washer to be mated with metal pieces having a range of widths and profiles, such as the slotted rails used to support arrays of photovoltaic panels.

41 Claims, 4 Drawing Sheets

(56) References Cited

U.S. PATENT DOCUMENTS

| | | | |
|---|---|---|---|
| 1,916,526 A | 7/1933 | Olson | |
| 2,034,258 A | 3/1936 | Hausser | |
| 2,034,494 A | 3/1936 | Stoll | |
| 2,069,402 A | 2/1937 | Cowlin | |
| 2,149,359 A | 3/1939 | Olson | |
| 2,179,575 A | 11/1939 | Hosking | |
| 2,192,165 A * | 2/1940 | Caldwell | 439/455 |
| 2,250,280 A | 7/1941 | Starbird | |
| 2,271,732 A | 2/1942 | Chappuis | |
| 2,561,679 A | 7/1951 | Waller | |
| 2,796,457 A | 6/1957 | Stinger | |
| 2,934,684 A | 4/1960 | Fegan | |
| 3,138,658 A | 6/1964 | Weimer | |
| 3,175,462 A | 3/1965 | Disley | |
| 3,247,316 A | 4/1966 | Weimer, Jr. | |
| 3,253,247 A | 5/1966 | Vos | |
| 3,285,313 A | 11/1966 | Blakesley | |
| 3,340,494 A | 9/1967 | Gutshali | |
| 3,388,369 A | 6/1968 | Zalmans | |
| 3,481,381 A | 12/1969 | Black | |
| 3,504,101 A | 3/1970 | Muto | |
| 3,541,226 A | 11/1970 | Cea et al. | |
| 3,541,227 A | 11/1970 | Bendrick | |
| 3,626,357 A | 12/1971 | Kindell et al. | |
| 3,715,705 A | 2/1973 | Kuo | |
| 3,719,919 A | 3/1973 | Tibolla | |
| 3,761,867 A | 9/1973 | Churla | |
| 3,810,069 A | 5/1974 | Jaconette, Jr. | |
| 4,022,262 A | 5/1977 | Gunn | |
| 4,023,882 A | 5/1977 | Pettersson | |
| 4,256,359 A | 3/1981 | Storck | |
| 4,263,474 A | 4/1981 | Tennant | |
| 4,291,934 A | 9/1981 | Kund | |
| 4,406,505 A | 9/1983 | Avramovich | |
| 4,473,714 A | 9/1984 | Brownell et al. | |
| 4,495,515 A | 1/1985 | Pamiello | |
| 4,498,715 A | 2/1985 | Peppler | |
| 4,560,224 A | 12/1985 | Weisenburger | |
| 4,659,870 A | 4/1987 | Jones | |
| 4,704,058 A | 11/1987 | Grunwell | |
| 4,875,876 A | 10/1989 | O'Loughlin | |
| 4,900,209 A | 2/1990 | Reynolds | |
| 4,961,712 A | 10/1990 | Schwenk et al. | |
| 5,078,613 A | 1/1992 | Salmon | |
| 5,100,506 A | 3/1992 | Sturtevant et al. | |
| 5,106,252 A * | 4/1992 | Shapton | 411/539 |
| 5,135,165 A | 8/1992 | Greenhow | |
| 5,207,588 A | 5/1993 | Ladouceur et al. | |
| 5,236,272 A | 8/1993 | Hibbard | |
| 5,399,098 A | 3/1995 | Quillet et al. | |
| 5,435,748 A | 7/1995 | Leeb | |
| 5,441,417 A | 8/1995 | Ladouceur et al. | |
| 5,453,027 A | 9/1995 | Buell et al. | |
| 5,501,008 A | 3/1996 | Leeb | |
| 5,620,290 A | 4/1997 | Homfeldt et al. | |
| 5,644,830 A | 7/1997 | Ladouceur et al. | |
| 5,828,008 A | 10/1998 | Lockwood et al. | |
| 5,921,737 A | 7/1999 | Ibey | |
| 6,102,750 A | 8/2000 | Little | |
| 6,297,447 B1 | 10/2001 | Burnett et al. | |
| 6,343,904 B1 | 2/2002 | Wang | |
| 6,347,915 B1 | 2/2002 | Balzano | |
| 6,368,038 B1 | 4/2002 | Uno | |
| 6,488,461 B1 | 12/2002 | Zacharias | |
| 6,939,097 B2 | 9/2005 | Carr et al. | |
| 6,976,816 B2 | 12/2005 | Slesinski et al. | |
| 6,987,660 B2 | 1/2006 | Stevenson et al. | |
| 7,749,256 B2 | 7/2010 | Farris | |
| 8,092,129 B2 | 1/2012 | Wiley et al. | |
| 2003/0031526 A1 | 2/2003 | Grant | |
| 2008/0014046 A1 | 1/2008 | Bauer | |
| 2008/0053517 A1 | 3/2008 | Plaisted et al. | |
| 2010/0095492 A1 | 4/2010 | Boone | |
| 2011/0123297 A1 | 5/2011 | Tang | |
| 2012/0201601 A1 | 8/2012 | Rizzo | |

OTHER PUBLICATIONS

Wiley WEEB Lug Datasheet, Bumdy LLC 2012.
Wiley WEEB DP&W Solar Power FAB CRS Installation Instructions, Wiley Electronics LLC 2006-2010.
Wiley WEEB Solar Liberty Smart Raxx Installation Instructions, Wiley Electronics LLC 2006-2009.
Bumdy/Wiley WEEB-PMC Bonding Washer Installation Instructions, Bumdy LLC 2012.
Bumdy/Wiley WEEB-CMC Bonding Washer Installation Instructions, Bumdy LLC 2012.

* cited by examiner

ADJUSTABLE BONDING WASHER

FIELD OF THE INVENTION

The invention relates to the assembly of photovoltaic arrays and other apparatus requiring electrical connection between metal parts.

BACKGROUND OF THE INVENTION

U.S. Pat. No. 8,092,129 to Wiley, et al., which is incorporated by reference herein in its entirety, discloses a variety of bonding washer configurations for creating an electrical bond between metal pieces that are to be mechanically fastened together, such as photovoltaic panels and their supporting aluminum rails. Many of these bonding washers and their commercial counterparts and variants have oppositely directed teeth designed to penetrate the anodic coatings of the metal pieces when clamped together. Some have features that retain them in position on one metal piece to facilitate assembly with another metal piece. In some embodiments the teeth are positioned to engage the metal pieces near their fastener holes, while in others the teeth are positioned to engage the metal pieces near their outer edges. Typically, these bonding washers are designed to be compatible with specific metal piece profiles and/or widths.

SUMMARY OF THE INVENTION

The adjustable bonding washer of the invention has enhanced versatility afforded by its two relatively movable parts, each of which carries oppositely directed teeth that engage the metal pieces when fastened together. The bonding washer of the invention thus can be mated with metal pieces having a range of widths and profiles and is especially useful when clamping solar panels to slotted support rails, which typically retain sliding nuts in their slots. The invention also covers a method of electrically bonding two metal pieces using such a bonding washer.

An adjustable bonding washer (assembly) according to the invention thus comprises first and second metallic parts each having at least one pair of oppositely directed external teeth formed thereon, the parts being slidable relative to each other along an axis and substantially constrained from relative off-axis movement by axially extending guide surfaces formed thereon.

Each part preferably comprises a substantially flat sheet metal body. The guide surfaces preferably comprise two opposite edges of the first part and bent edges at two opposite sides of the second part that lie close to the opposite edges of the first part when the parts are assembled. Each of the bent edges preferably comprises a folded-over marginal body portion defining a channel in which the first part can slide. Each part may have a fastener opening therethrough for accommodating a fastener that would pass between the channels. Each pair of external teeth preferably comprises a pair of substantially aligned, diverging teeth.

Also preferred is the inclusion of least one protrusion (e.g., an internal tooth) in each channel formed on at least one of the parts and adapted to engage the other part when the parts are assembled. The first part preferably has axially spaced features such as notches engageable by the protrusion, such features and the protrusion being configured to resist axial separation of the parts once they are assembled. Each part may have a bent-out alignment tab at an axial end thereof, the alignment tabs being disposed at opposite ends of the bonding washer when the parts are assembled.

The method according to the invention of electrically bonding first and second metal pieces comprises the steps of:
(a) providing an adjustable bonding assembly comprising first and second metallic parts slidable relative to each other along an axis, each part having a primary face with at least one integral projecting tooth and an opposite secondary face with at least one integral projecting tooth;
(b) placing the first part against the first metal piece such that the external tooth/teeth of the primary side contacts the first metal piece;
(c) sliding the second part toward the first part so that the external tooth/teeth of the primary side of the second part contacts the first metal piece;
(d) placing the second metal piece against the bonding assembly so that it contacts the tooth/teeth of the secondary side of each part; and
(e) clamping the metal pieces together with the bonding assembly between them so that the teeth are forcibly embedded into the metal pieces to make electrical contact therewith.

BRIEF DESCRIPTION OF THE DRAWING

Preferred embodiments of the disclosed invention are described in detail below purely as examples, with reference to the accompanying drawing, in which.

DETAILED DESCRIPTION OF THE INVENTION

As used in this application, terms such as "front," "rear," "side," "top," "bottom," "above," "below," "upwardly" and "downwardly" are intended to facilitate the description of the invention and are not to be construed as limiting the structure of the invention to any particular position or orientation.

Figure 1:
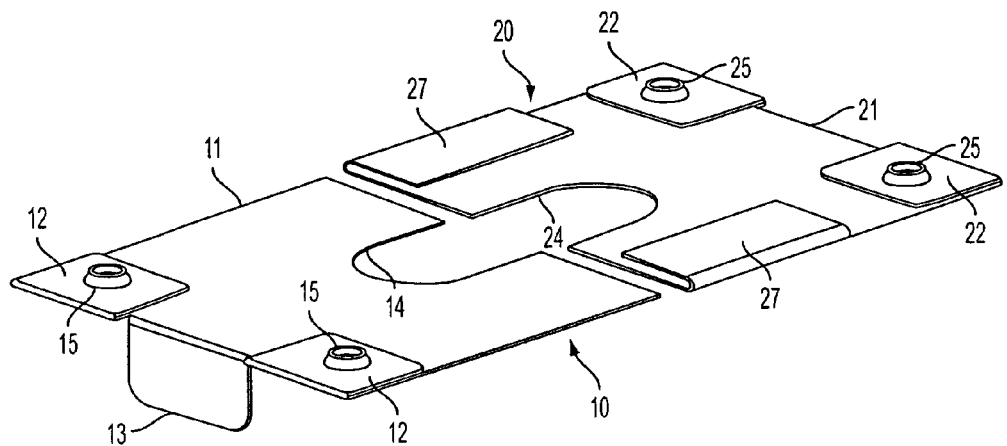
FIG. 1 is a top perspective view of a bonding washer according to the invention, showing its male and female parts unmated.
Figure 2:
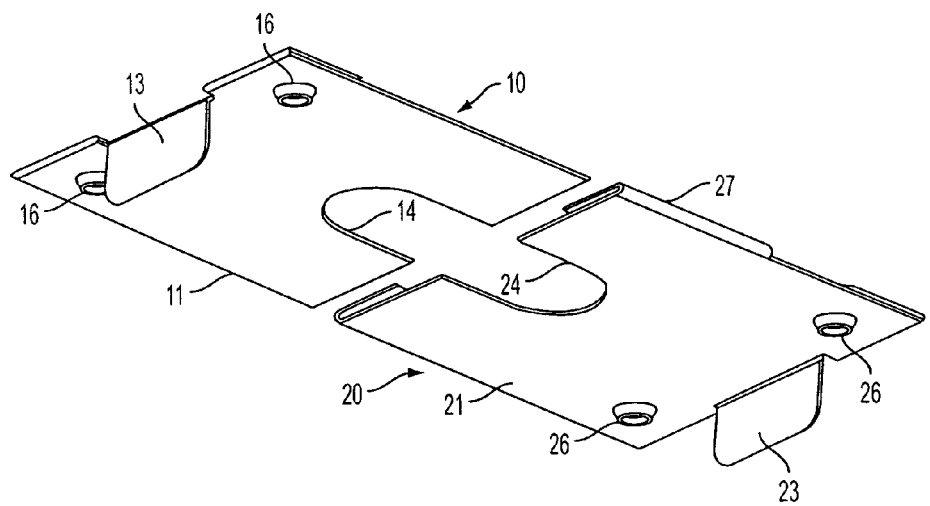
FIG. 2 is a bottom perspective view of the bonding washer of FIG. 1.

Referring to FIGS. 1 and 2, a bonding washer according to the invention comprises a male part 10 and a female part 20, both preferably made of sheet stainless steel. Male part 10 comprises a flat body 11 having two integral ears 12 at one end folded up and back against the body and an integral alignment tab 13 at the same end bent down perpendicular to the body. The opposite end of the body has an open-ended recess or notch 14. Each of the ears 12 has a raised, hollow, circular tooth 15 extending away from the body. The underside of the body (see FIG. 2) also has two raised, hollow, circular teeth 16 extending away from the body. Teeth 15 and 16 are positioned so as to form two sets of aligned, oppositely directed teeth.

Female part 20 similarly comprises a flat body 21 having two ears 22 at one end folded up and back against the body and an integral alignment tab 23 at the same end bent down perpendicular to the body. The opposite end of body 21 has an open-ended recess or notch 24 similar to recess 14 of the male part. Each of the ears 22 has a raised, hollow circular tooth 25 extending away from the body. The underside of the body also has two raised, hollow, circular teeth 26 extending away from the body. Teeth 25 and 26 are positioned so as to form two sets of aligned, oppositely directed teeth. Teeth 15, 16, 25 and 26 preferably are circular as shown but may take any form suitable for penetrating anodic coatings, such as other forms disclosed in U.S. Pat. No. 8,092,129.

Figure 3:
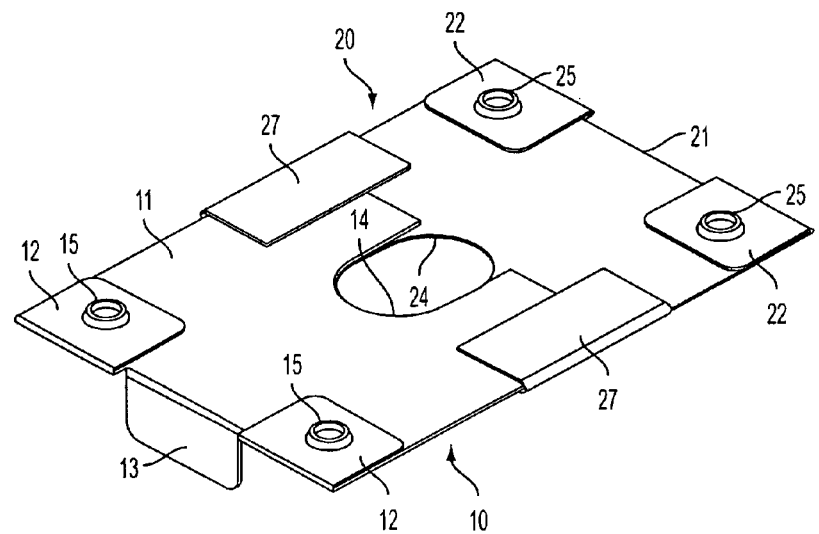
FIG. 3 is a top perspective view of the bonding washer of FIG. 1, showing its parts assembled.
Figure 4:
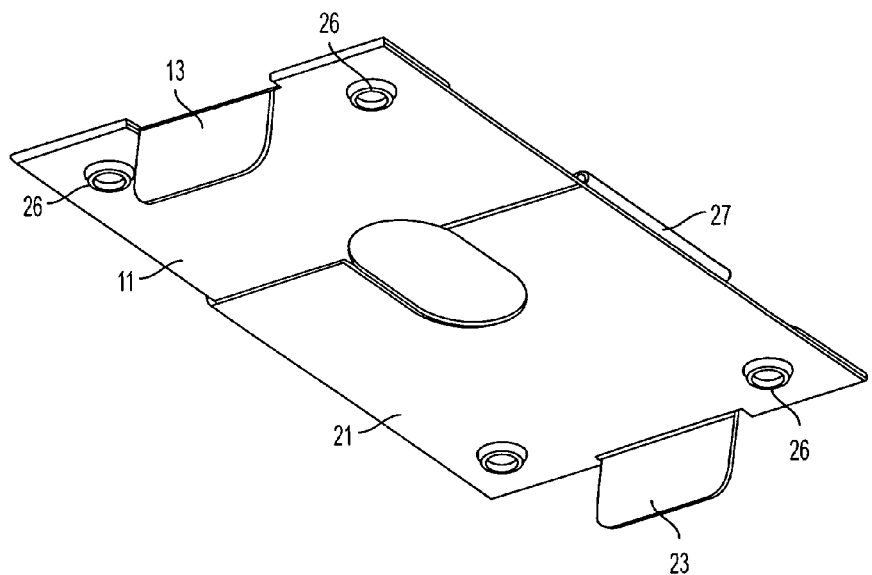
FIG. 4 is a bottom perspective view of the assembly of FIG. 3.

Female part 20 also has an integral flap 27 at each side of the body 21. Each flap 27 is folded up and back over the body substantially parallel to but spaced from it, thereby forming a channel in which the body 11 of male part slides. When mated (see FIGS. 3 and 4), the two notches 14, 24 merge to form an opening of adjustable size through which a fastener can extend when the bonding washer is installed.

Figure 5:
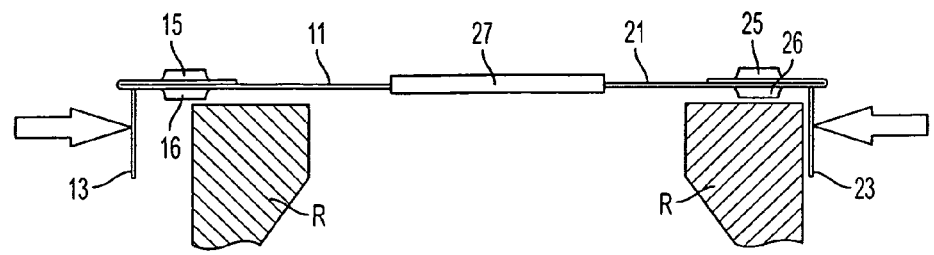
FIG. 5 is a side elevational view of the assembly of FIGS. 3 and 4 as it is being installed on a rail.
Figure 6:
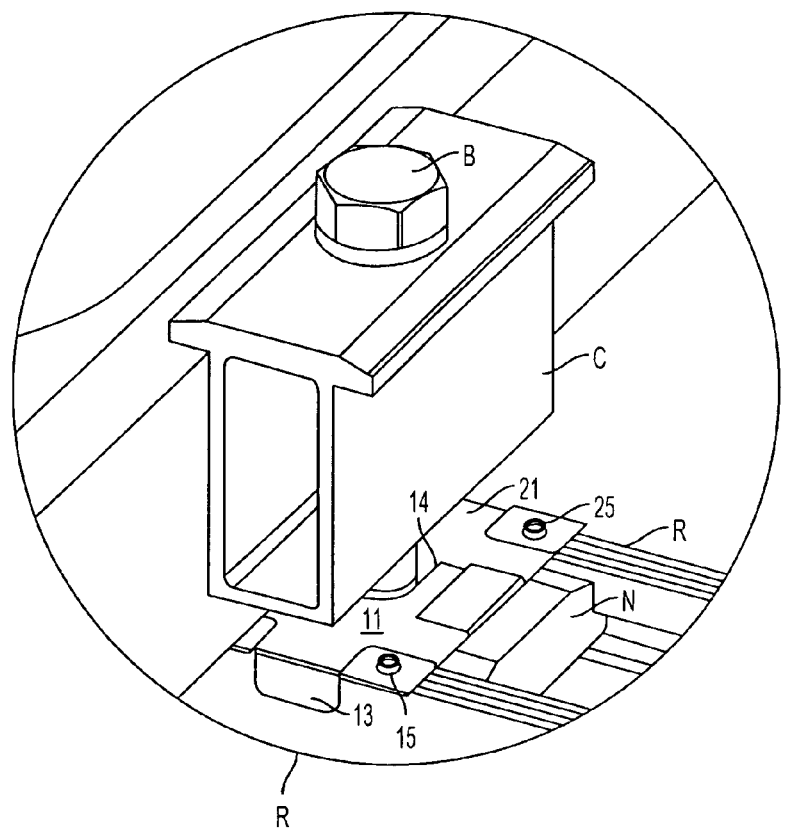
FIG. 6 is a partial perspective view of a partially assembled solar module assembly that includes a bonding washer according to the invention.

FIGS. 5 and 6 show how the bonding washer of the invention can be installed on a metal piece, in this case an aluminum rail R for supporting a photovoltaic panel P. The male and female parts 10, 20 preferably are mated partially before installation with enough space between their respective alignment tabs 13, 23 to accommodate the rail. The assembly is then placed atop the rail and the parts are slid further together until tabs 13, 23 contact the rail R. The panel is then mounted atop the rail and tightly secured by a clamp C and a bolt B, which engages a rail-retained nut N. The exerted clamping force embeds the tips of teeth 15, 16, 25, 26 in the anodic coatings of the rail and the panel. Should flaps 27 contact any of the superposed components, they will be flattened against body 11 of male part 10 and not significantly interfere with the bonding action of the teeth. Nevertheless, it is preferred that upper teeth 15, 25 extend above flaps 27 prior to any deformation of the flaps. This arrangement is present but not easily seen in FIG. 5 due its scale. The same arrangement is present in all disclosed embodiments and is clearly visible in FIG. 8.

Figure 7:
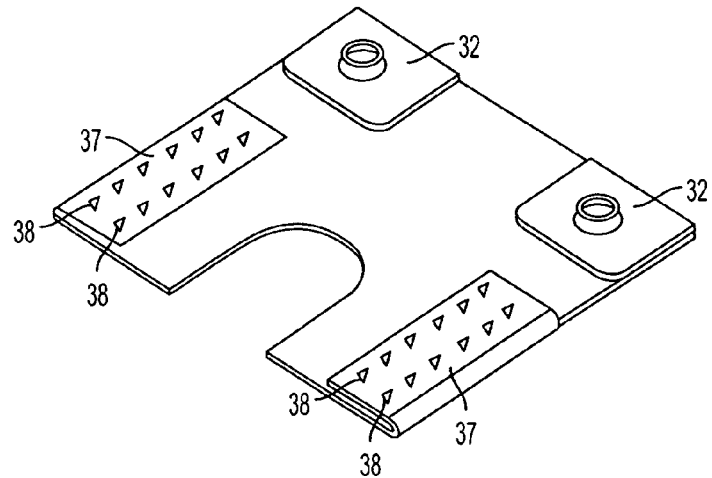
FIG. 7 is a top perspective view of an alternate embodiment of the female part of the bonding washer of the invention.

FIG. 7 shows one alternate configuration of the female part. In this embodiment, flaps 37 are punched to form rows of integral, downwardly directed (interior) teeth 38 that engage and scrape along the body of male part 10 as the parts are telescoped together during installation. This engagement enhances the electrical bond between the parts 10, 20 and keeps them from separating. FIG. 7 shows triangular teeth (visible through triangular punched holes in flaps 37) but they may be of any shape suitable for their intended purpose. Teeth 38 may be raked away from the mating direction to enhance their resistance to separation of the parts.

Figure 8:
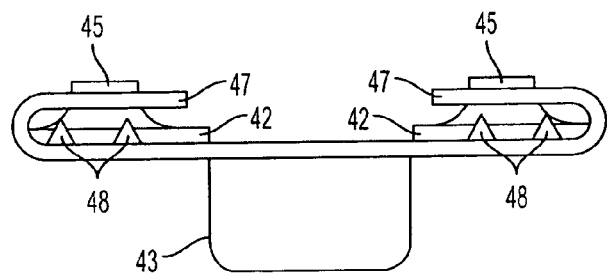
FIG. 8 is an end elevational view of another alternate embodiment of the female part of the bonding washer of the invention.

FIG. 8 shows another alternate configuration for the female part. In this embodiment, interior scraping teeth 48 are integrally formed on body 41 and project upward toward flaps 47. As with the embodiment of FIG. 7, any suitable tooth form and angle is acceptable. Note that teeth 45 on ears 42 project beyond flaps 47, which is the same preferred arrangement for all embodiments.

Figure 9:
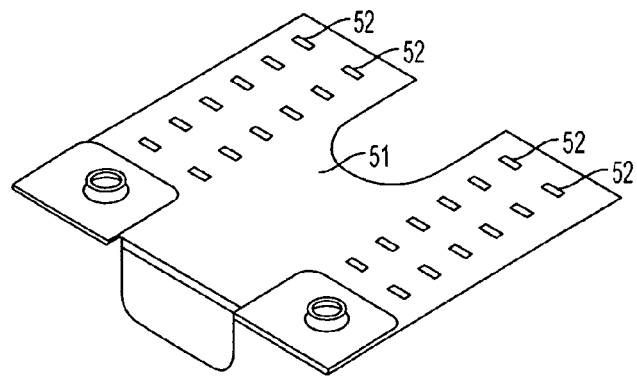
FIG. 9 is a top perspective view of an alternate embodiment of the male part of the bonding washer of the invention.

FIG. 9 shows an alternate configuration for the male part. In this embodiment, the body 51 includes rows of recesses or notches 52 that are sequentially engaged by the teeth of the female part (FIG. 7 or FIG. 8) as the parts are telescoped together. This arrangement effectively resists separation of the parts and is especially effective if the teeth on the female part are raked.

While preferred embodiments have been chosen to illustrate the bonding washer of the invention, it will be understood by those skilled in the art that various changes and modifications may be made without departing from the scope of the invention as defined by the appended claims.

What is claimed is:

1. An adjustable bonding washer for making an electrical connection between two metal pieces when the metal pieces are rigidly held together by a fastener with at least a portion of the bonding washer disposed between them, the adjustable bonding washer comprising:
   a metallic female part; and
   a metallic male part, said male and female parts being slidable relative to each other along an axis,
   wherein said female part comprises:
      a body having a pair of mutually facing, substantially parallel channels at two opposite sides thereof;
      a first set of external teeth, numbering one or more, formed on said body and extending therefrom in a first direction substantially perpendicular thereto, each tooth of said first set having a distal edge;
      a second set of external teeth, numbering one or more, formed on said body and extending therefrom in a second direction substantially opposite said first direction, each tooth of said second set having a distal edge; and
      an opening in said body between said channels through which a fastener can extend, and
   wherein said male part is dimensioned to be slidably embraced by said channels of said female part and comprises:
      a first set of external teeth, numbering one or more, formed thereon and extending therefrom in a first direction substantially perpendicular thereto, each tooth of said first set having a distal edge;
      a second set of external teeth, numbering one or more, formed thereon and extending therefrom in a second direction substantially opposite said first direction, each tooth of said second set having a distal edge; and
      an opening through which a fastener can extend and alignable with the opening in the body of said female part when said male part is mated with said female part,
   whereby, when said male part is mated with said female part and a fastener extending through said openings is tightened with said first and second sets of external teeth between the metal pieces, the distal edges of said external teeth are forcibly embedded into the metal pieces to make electrical contact therewith.

2. The adjustable bonding washer of claim 1, wherein each of said parts is made of sheet metal and each of said channels is formed by a folded-over marginal body portion of said female part.

3. The adjustable bonding washer of claim 1, wherein for each of said parts, at least one tooth of said second set of teeth is substantially aligned with a tooth of said first set of teeth to define at least one pair of substantially aligned, diverging teeth.

4. The adjustable bonding washer of claim 3, wherein the external teeth of each of said parts are near an axial end thereof.

5. The adjustable bonding washer of claim 4, wherein one tooth of said at least one pair of substantially aligned, diverging teeth is formed on a portion of said body that is folded back against a main part of said body.

6. The adjustable bonding washer of claim 4, wherein each of said parts has a bent-out alignment tab at an axial end thereof adjacent said external teeth, the alignment tabs and the external teeth being disposed at opposite ends of the bonding washer when said parts are assembled.

7. The adjustable bonding washer of claim 1, wherein said parts are assembled by axial movement of said male part in a forward direction relative to said female part, further comprising at least one second locking element on said female part in each channel and at least one first locking element on each side of said male part adapted to engage a respective second locking element, said locking elements configured to permit movement of said male part in said forward direction and to resist movement of said male part in a rearward direction.

8. The adjustable bonding washer of claim 7, wherein said second locking element comprises at least one internal tooth angled toward said forward direction and said first locking element comprises axially spaced notches engageable by said at least one internal tooth.

9. The adjustable bonding washer of claim 1, wherein said fastener openings are elongated.

10. The adjustable bonding washer of claim 9, wherein at least one of said fastener openings is open-ended.

11. An adjustable bonding washer for making an electrical connection between two metal pieces when the metal pieces are rigidly held together by a fastener with at least a portion of the bonding washer disposed between them, the adjustable bonding washer comprising first and second metallic parts each having a fastener opening therethrough and at least one pair of oppositely directed external teeth formed thereon, said parts being slidable relative to each other along an axis and substantially constrained from relative off-axis movement by axially extending guide surfaces formed thereon, whereby, when a fastener extending through said fastener openings is tightened with said external teeth between the metal pieces, said external teeth are forcibly embedded into the metal pieces to make electrical contact therewith.

12. The adjustable bonding washer of claim 11, wherein each of said parts comprises a substantially flat sheet metal body, and said guide surfaces comprise two opposite edges of said first part and bent edges at two opposite sides of said second part that lie close to said opposite edges of said first part when said parts are assembled.

13. The adjustable bonding washer of claim 12, wherein each of said bent edges comprises a folded-over marginal body portion defining a channel in which said first part can slide.

14. The adjustable bonding washer of claim 13, further comprising at least one protrusion in each channel formed on at least one of said parts and adapted to engage the other of said parts when the parts are assembled.

15. The adjustable bonding washer of claim 14, wherein said at least one protrusion comprises at least one internal tooth formed on said second part.

16. The adjustable bonding washer of claim 15, wherein said first part has axially spaced notches engageable by said at least one internal tooth.

17. The adjustable bonding washer of claim 16, wherein said at least one internal tooth and/or said notches are configured to resist axial separation of said parts once they are assembled.

18. The adjustable bonding washer of claim 17, wherein said notches comprise slots, and said at least one internal tooth is angled toward the direction of increased sliding engagement of said parts.

19. The adjustable bonding washer of claim 1, wherein at least one of said fastener openings is elongated.

20. The adjustable bonding washer of claim 1, wherein at least one of said fastener openings is open-ended.

21. The adjustable bonding washer of claim 20, wherein both of said fastener openings are elongated.

22. The adjustable bonding washer of claim 1, wherein said parts are assembled by axial movement of said first part in a forward direction relative to said second part, further comprising at least one first locking element on said first part and at least one second locking element on said second part, said first and second locking elements engageable with one another and configured to permit movement of said first part in said forward direction and to resist movement of said first part in a rearward direction.

23. The adjustable bonding washer of claim 22, wherein each of said parts has a bent-out alignment tab at an axial end thereof, the alignment tabs being disposed at opposite ends of the bonding washer when said parts are assembled.

24. The adjustable bonding washer of claim 22, wherein said second locking element comprises at least one internal tooth angled toward said forward direction and said first locking element comprises axially spaced notches engageable by said at least one internal tooth.

25. The adjustable bonding washer of claim 1, wherein said parts are assembled such that said external teeth are near opposite ends of the bonding washer.

26. The adjustable bonding washer of claim 25, wherein each of said parts has a bent-out alignment tab at an axial end thereof, the alignment tabs being disposed at opposite ends of the bonding washer when said parts are assembled.

27. The adjustable bonding washer of claim 1, wherein each of said pairs of external teeth comprises a pair of substantially aligned, diverging teeth.

28. The adjustable bonding washer of claim 27, wherein one tooth of each pair of external teeth is formed on its respective metallic part and the other tooth of each said pair of external teeth is formed on a portion of its said respective metallic part that is folded back against said portion thereof.

29. An adjustable bonding assembly for making an electrical connection between two metal pieces when the metal pieces are rigidly clamped together with at least a portion of the adjustable bonding assembly disposed between them, the adjustable bonding assembly comprising first and second metallic parts each having at least one pair of oppositely directed external teeth formed thereon, said parts being slidable relative to each other along an axis and substantially constrained from relative off-axis movement by axially extending guide surfaces formed thereon, whereby, when the metal pieces are clamped together with pairs of said external teeth between them, the distal edges of said teeth are forcibly embedded into the metal pieces to make electrical contact therewith.

30. The adjustable bonding assembly of claim 29, wherein each of said parts comprises a substantially flat sheet metal body, and said guide surfaces comprise two opposite edges of said first part and bent edges at two opposite sides of said second part that lie close to said opposite edges of said first part when said parts are assembled.

31. The adjustable bonding assembly of claim 30, wherein each of said bent edges comprises a folded-over marginal body portion defining a channel in which said first part can slide.

32. The adjustable bonding assembly of claim 31, further comprising at least one protrusion in each channel formed on at least one of said parts and adapted to engage the other of said parts when the parts are assembled.

33. The adjustable bonding assembly of claim 32, wherein said at least one protrusion comprises at least one internal tooth formed on said second part.

34. The adjustable bonding assembly of claim 33, wherein said first part has axially spaced notches engageable by said at least one internal tooth.

35. The adjustable bonding assembly of claim 34, wherein said at least one internal tooth and/or said notches are configured to resist axial separation of said parts once they are assembled.

36. The adjustable bonding assembly of claim 29, wherein said parts are assembled by axial movement of said first part in a forward direction relative to said second part, further comprising at least one first locking element on said first part and at least one second locking element on said second part, said first and second locking elements engageable with one another and configured to permit movement of said first part in said forward direction and to resist movement of said first part in a rearward direction.

37. The adjustable bonding assembly of claim 36, wherein each of said parts has a bent-out alignment tab at an axial end thereof, the alignment tabs being disposed at opposite ends of the bonding washer when said parts are assembled.

38. The adjustable bonding assembly of claim 29, wherein each of said pairs of external teeth comprises a pair of substantially aligned, diverging teeth.

39. A method of electrically bonding first and second metal pieces, the method comprising the steps of:

(a) providing an adjustable bonding assembly comprising first and second metallic parts slidable relative to each other along an axis, each of said parts having a primary face with at least one integral tooth projecting therefrom and an opposite secondary face with at least one integral tooth projecting therefrom;

(b) placing said first part against said first metal piece such that said at least one external tooth of said primary side thereof contacts said first metal piece;

(c) sliding said second part toward said first part so that said at least one external tooth of said primary side of said second part contacts said first metal piece;

(d) placing said second metal piece against the bonding assembly so that it contacts said at least one tooth of said secondary side of each of said parts; and (e) clamping said metal pieces together with said bonding assembly therebetween so that said teeth are forcibly embedded into the metal pieces to make electrical contact therewith.

40. The method of claim 39, wherein each of said parts has an alignment tab projecting from said primary surface thereof at opposite ends of the bonding assembly, and wherein step (c) comprises shortening the length of the bonding assembly until said alignment tabs abut said first metal piece.

41. The method of claim 40, wherein each of said parts has a fastener opening therethrough, and step (e) comprises tightening a fastener extending through said openings.

\* \* \* \* \*